US012259011B2

(12) United States Patent
Kim et al.

(10) Patent No.: US 12,259,011 B2
(45) Date of Patent: Mar. 25, 2025

(54) DOUBLE CLUTCH ASSEMBLY OF ELECTRIC DRIVING APPARATUS FOR VEHICLE AND ELECTRIC DRIVING APPARATUS INCLUDING SAME

(71) Applicant: ERAE AMS CO., LTD., Daegu (KR)

(72) Inventors: Tae Geun Kim, Daegu (KR); Jung Rak Son, Daegu (KR); Myung Chul Jung, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 0 days.

(21) Appl. No.: 18/270,370

(22) PCT Filed: Dec. 27, 2021

(86) PCT No.: PCT/KR2021/019936
§ 371 (c)(1),
(2) Date: Jun. 29, 2023

(87) PCT Pub. No.: WO2022/145922
PCT Pub. Date: Jul. 7, 2022

(65) Prior Publication Data
US 2024/0060540 A1    Feb. 22, 2024

(30) Foreign Application Priority Data

Dec. 30, 2020   (KR) ......................... 10-2020-0187649
Dec. 30, 2020   (KR) ......................... 10-2020-0187650
(Continued)

(51) Int. Cl.
*F16H 3/093*     (2006.01)
*F16D 13/68*     (2006.01)
(Continued)

(52) U.S. Cl.
CPC ........... *F16D 25/10* (2013.01); *F16D 13/683* (2013.01); *F16D 25/0638* (2013.01); *F16D 2021/0607* (2013.01); *F16D 2021/0661* (2013.01)

(58) Field of Classification Search
CPC ............ F16H 2003/0803; F16H 3/093; F16H 2003/0933; F16H 2003/0938; F16H 3/085; F16D 25/10; F16D 25/0638; F16D 13/52
See application file for complete search history.

(56) References Cited

U.S. PATENT DOCUMENTS 2,460,295 A    2/1949   Keese
10,493,978 B2  12/2019  Haupt
(Continued)

FOREIGN PATENT DOCUMENTS

CN    209454539 U    10/2019
CN    111051734 A     4/2020
(Continued)

OTHER PUBLICATIONS

International Search Report for PCT/KR2021/019936 dated Mar. 24, 2022.
(Continued)

*Primary Examiner* — Stacey A Fluhart
(74) *Attorney, Agent, or Firm* — Sughrue Mion, PLLC

(57) ABSTRACT

An electric driving apparatus includes: a housing; an electric machine; a speed shifting unit; and a double clutch unit. The double clutch unit includes: a clutch housing; a first clutch hub and a second clutch hub; a first clutch plate package; and a second clutch plate package. The speed shifting unit comprises a first output gear and a second output gear that can be independently rotationally driven by the motor shaft, and the clutch housing comprises a first gear and a second
(Continued)

gear configured to be engaged with the first and second output gears to implement rotational driving force at different rotational speeds.

16 Claims, 9 Drawing Sheets

(30) Foreign Application Priority Data

| Dec. 30, 2020 | (KR) | 10-2020-0187654 |
|---|---|---|
| Dec. 30, 2020 | (KR) | 10-2020-0187655 |
| Dec. 30, 2020 | (KR) | 10-2020-0187656 |

(51) Int. Cl.
*F16D 25/0638* (2006.01)
*F16D 25/10* (2006.01)
*F16D 21/06* (2006.01)

(56) References Cited

U.S. PATENT DOCUMENTS

| 10,753,405 | B2 | 8/2020 | Putzer et al. | |
| 11,143,272 | B2* | 10/2021 | Wu | F16H 37/0813 |
| 2017/0130815 | A1 | 5/2017 | Wang et al. | |
| 2017/0204941 | A1* | 7/2017 | Tseng | F16D 25/10 |
| 2019/0337505 | A1* | 11/2019 | Haupt | B60W 10/02 |
| 2019/0376564 | A1* | 12/2019 | Billmaier | B60K 23/08 |
| 2019/0376565 | A1* | 12/2019 | Oyabu | F16D 21/06 |
| 2020/0106337 | A1 | 4/2020 | Devaraj et al. | |

FOREIGN PATENT DOCUMENTS

| DE | 10 2019 133 510 A1 | 6/2020 |
| EP | 3 252 332 A1 | 12/2017 |
| JP | 61-1537 A | 1/1986 |
| JP | 2007-505276 A | 3/2007 |
| JP | 2010241178 A * | 10/2010 |
| JP | 2019-510940 A | 4/2019 |
| KR | 10-1999-0060734 A | 7/1999 |
| KR | 10-2013-0043638 A | 4/2013 |

OTHER PUBLICATIONS

Extended European Search Report dated Oct. 9, 2024 in Application No. 21915720.3.

* cited by examiner

[FIG. 1]
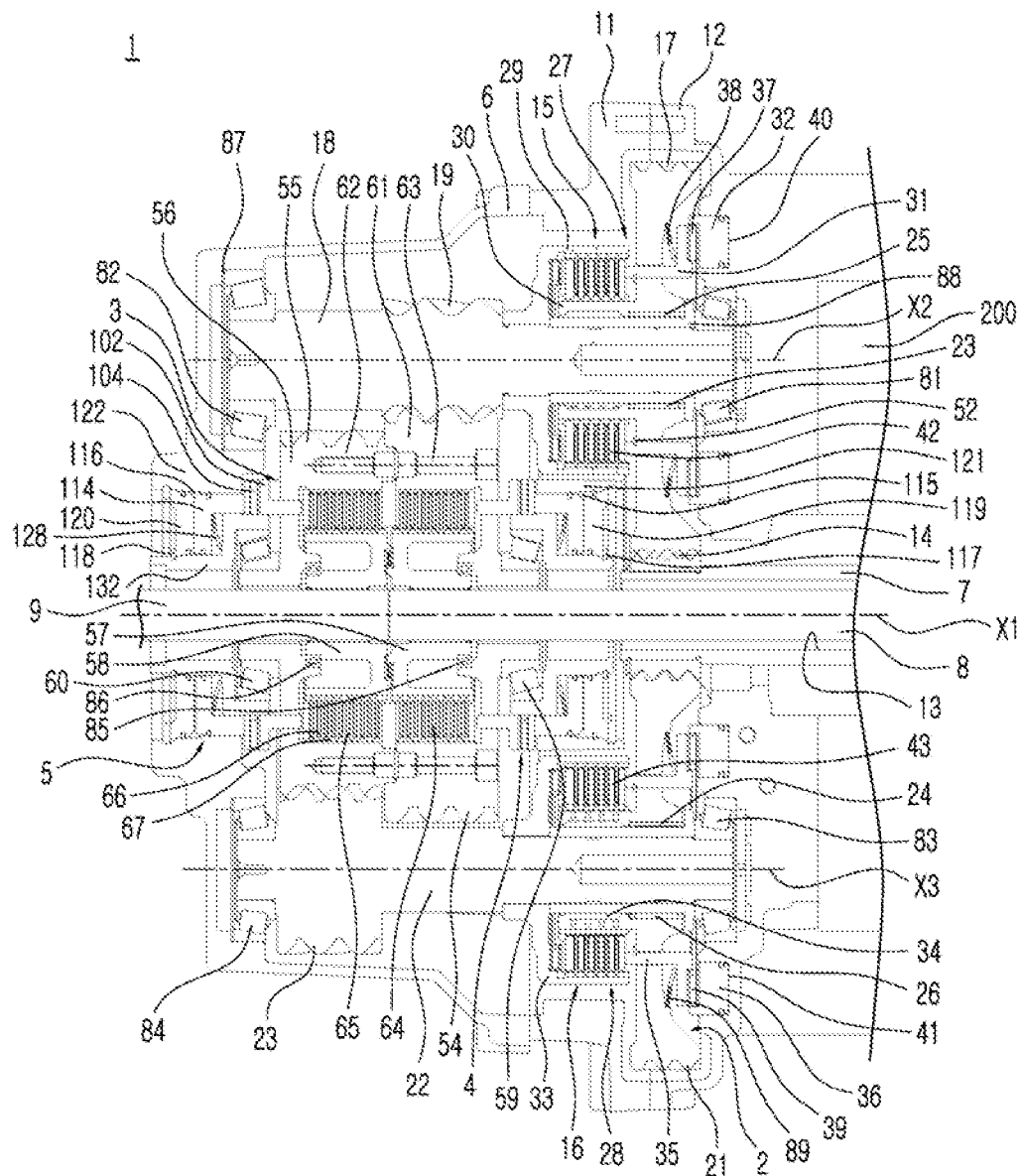

【FIG. 2】
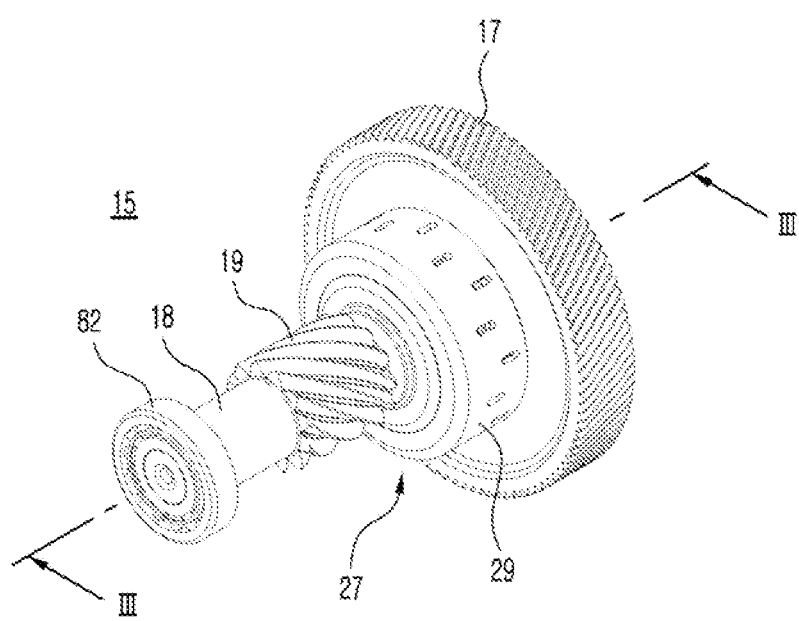

[FIG. 3]
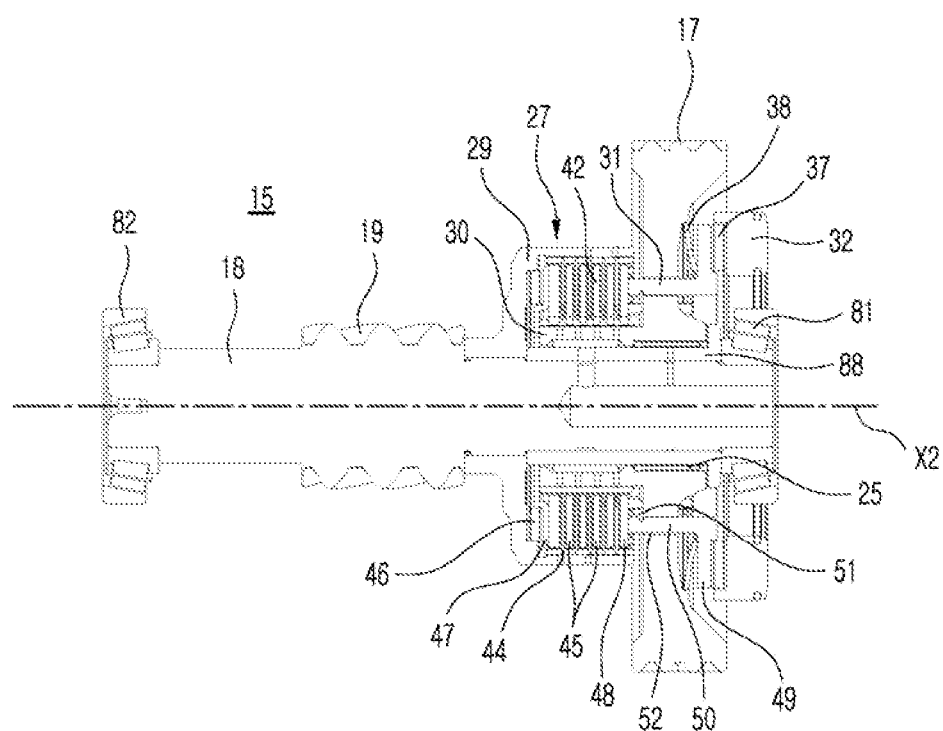

[FIG. 4]
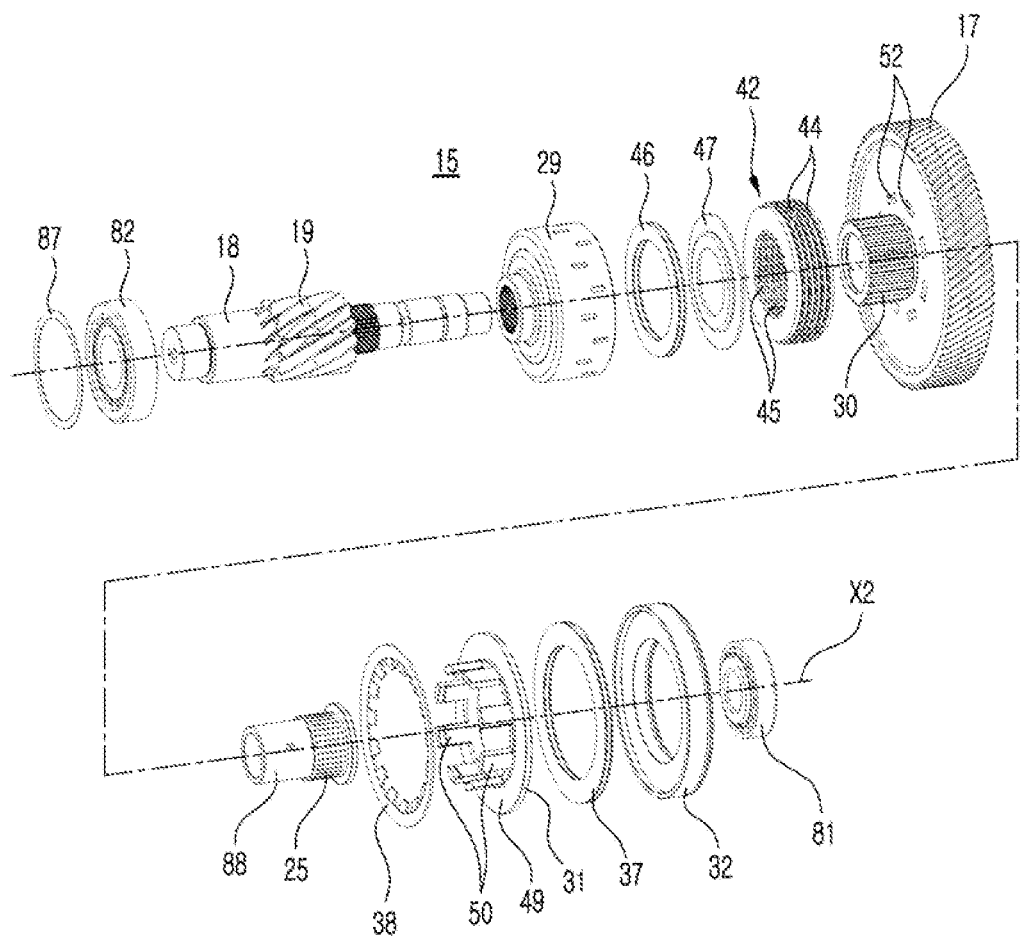

[FIG. 5]
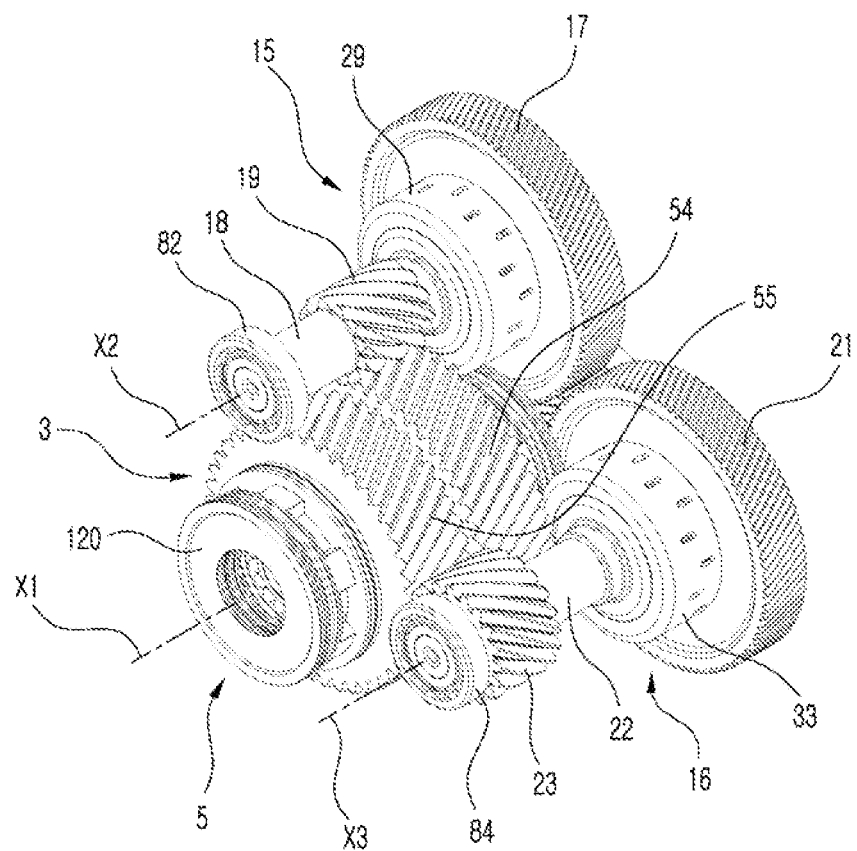

[FIG. 6]
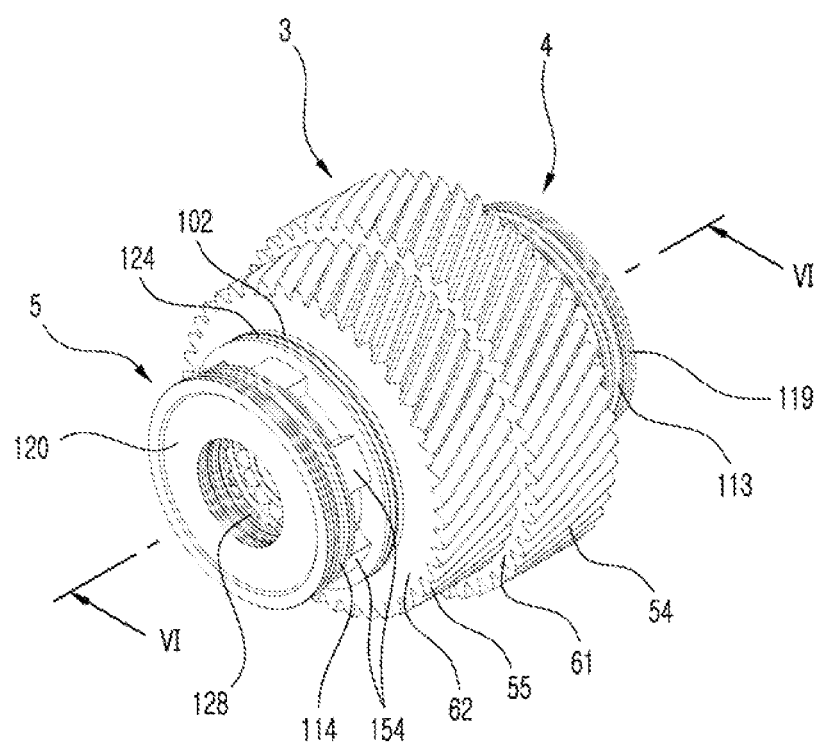

[FIG. 7]
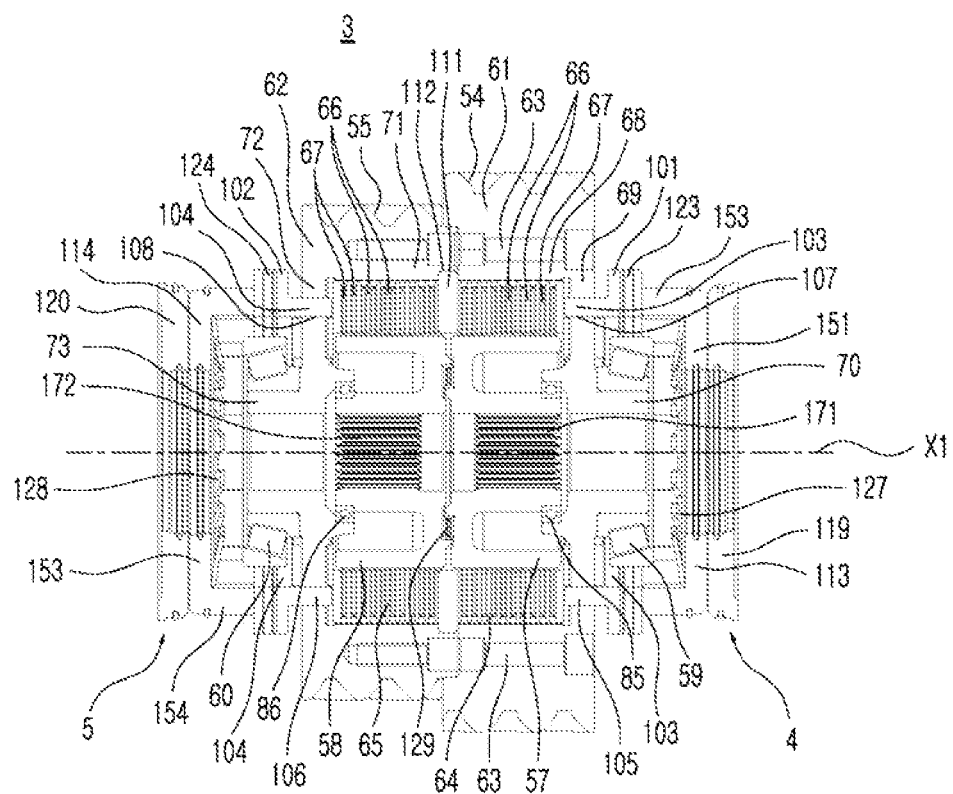

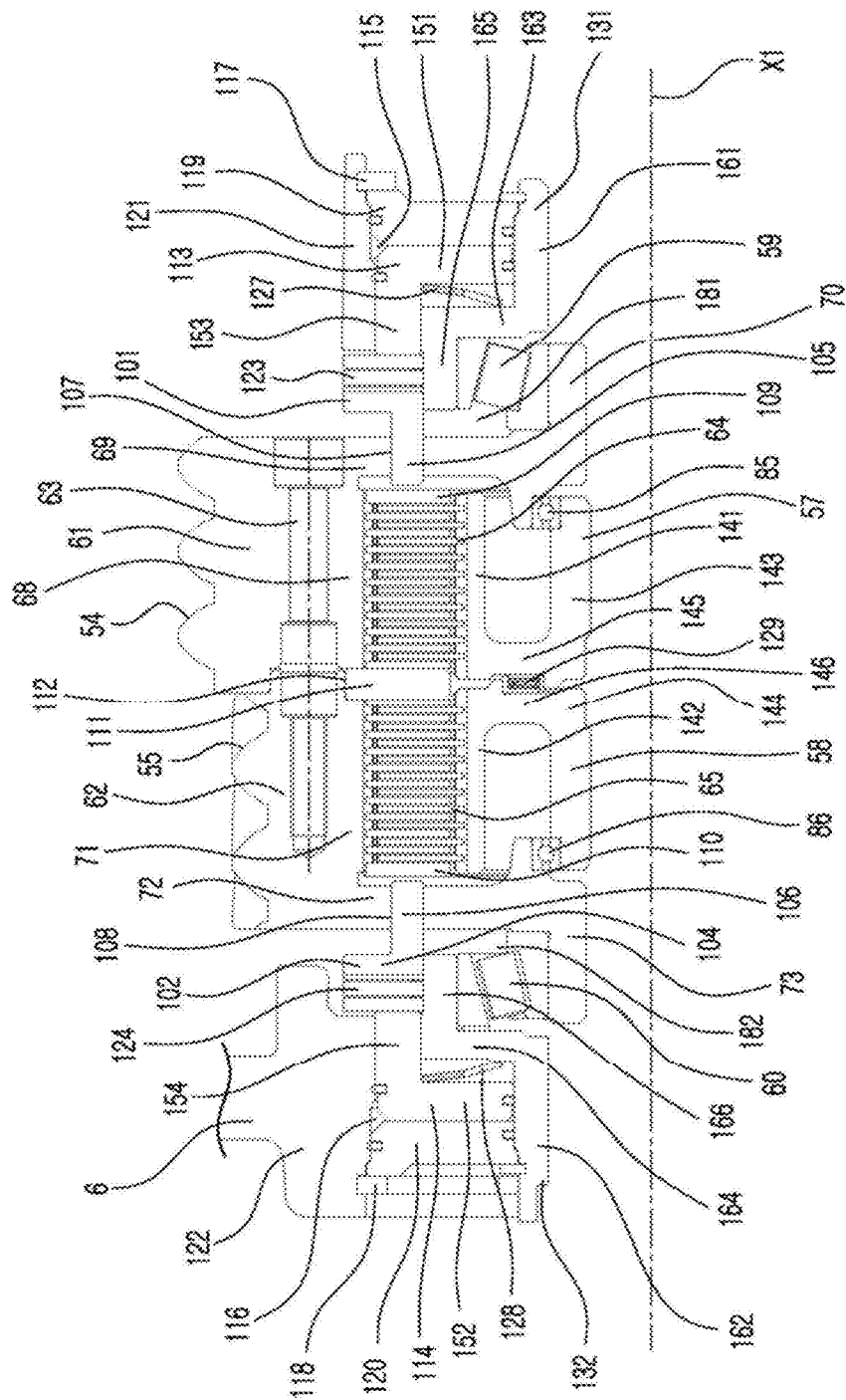
[FIG. 8]

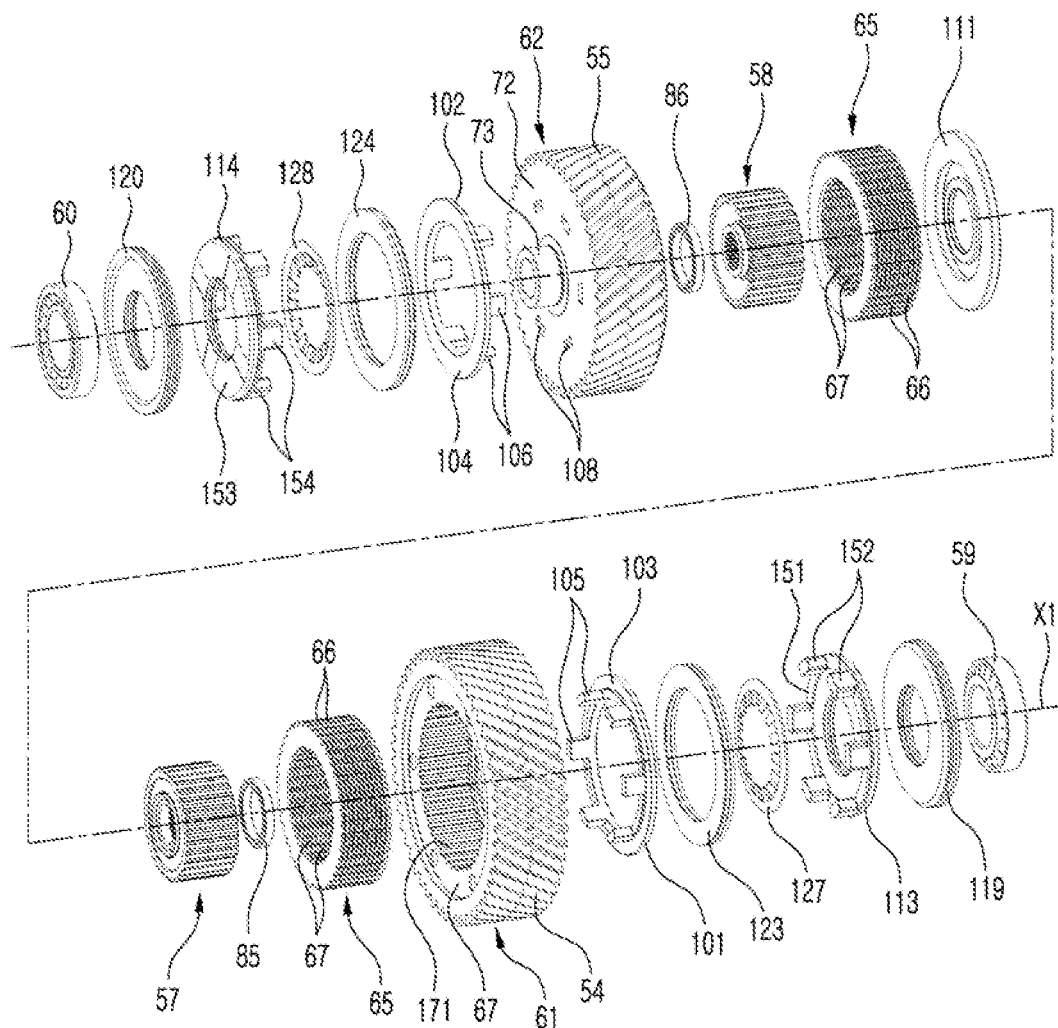
[FIG. 9]

DOUBLE CLUTCH ASSEMBLY OF ELECTRIC DRIVING APPARATUS FOR VEHICLE AND ELECTRIC DRIVING APPARATUS INCLUDING SAME

TECHNICAL FIELD

The present invention relates to an electric driving apparatus for transmitting power of an electric machine such as a motor.

BACKGROUND ART

An electric machine such as a motor is being used as a power source that replaces a conventional internal combustion engine or is added to an internal combustion engine, and a vehicle employing such an electric machine as a power source is called an electric vehicle or a hybrid vehicle.

When a motor is used as a power source, a speed reduction device for reducing the rotational speed of the rotational power of the motor is required. Since the motor can adjust the rotation speed, an electric driving apparatus implemented as a one-stage speed reduction apparatus is sometimes used, but an electric driving apparatus capable of two-stage speed reduction for efficiency improvement has been introduced. Such an electric driving apparatus may be configured to implement a torque vectoring function capable of independently adjusting torque transmitted to both drive wheels.

However, the conventional electric drive device has a problem in that the overall size of the device is large and the structure is complicated because it uses complex and bulky parts such as planetary gears for implementing speed reduction and torque vectoring functions. In addition, there is a need to improve the structural aspect of the device, improve manufacturing easiness, and reduce manufacturing cost through optimization of arrangement of a rotating shaft and bearings therein.

PRIOR DOCUMENTS

U.S. Pat. No. 10,493,978 (2019 Dec. 3.)
U.S. Pat. No. 10,753,405 (2020 Aug. 25.)

DETAILED DESCRIPTION OF THE INVENTION

Technical Problem

The problem to be solved by the present invention is to provide an electric driving apparatus having a two-stage speed reduction and torque vectoring function that is simple in structure and easy to manufacture.

Technical Solutions

An electric driving apparatus according to an embodiment of the present invention includes: a housing; an electric machine comprising a motor shaft rotatably supported by the housing; a speed shifting unit for reducing a rotational speed of a rotational driving force of the motor shaft; and a double clutch unit configured to selectively rotationally drive a first output shaft and a second output shaft. The double clutch unit includes: a clutch housing coupled to the speed shifting unit so as to be rotationally driven by the speed shifting unit and rotatably installed around a rotational axis; a first clutch hub and a second clutch hub respectively coupled to the pair of the output shafts to rotationally drive the pair of the output shafts and disposed adjacent to each other along the rotation axis in the clutch housing; a first clutch plate package operative to selectively effect a rotationally constrained engagement between the clutch housing and the first clutch hub; and a second clutch plate package operative to selectively effect a rotationally constrained engagement between the clutch housing and the second clutch hub. The speed shifting unit comprises a first output gear and a second output gear that can be independently rotationally driven by the motor shaft, and the clutch housing comprises a first gear and a second gear configured to be engaged with the first and second output gears to implement rotational driving force at different rotational speeds.

The clutch housing may include a first clutch housing and a second clutch housing that are disposed adjacent to each other along the rotation axis and coupled to each other to rotate together about the rotation axis.

The first and second clutch housings may be coaxially coupled to each other by a fastening member and the first gear and the second gear are respectively provided in the first clutch housing and the second clutch housing.

The electric driving apparatus according to another embodiment of the present invention may further include a reaction plate interposed between the first and second clutch plate packages to respectively support the first and second clutch plate packages along a direction of the rotation axis.

The reaction plate may be installed to be inserted into an annular groove formed by the first and second clutch housings to block movement along the direction of the rotation axis.

The first and second clutch hubs may be supported relative to each other so as to be relatively rotatable about the rotation axis by an axial bearing interposed therebetween.

The first gear and the second gear may respectively include a first and second annular gear provided on an outer circumferential surface of the clutch housing.

The clutch housing may include a first clutch housing and a second clutch housing that are disposed adjacent to each other along the rotation axis and fastened to each other to rotate together about the rotation axis, and the first and second annular gears may be provided on outer circumferential surfaces of the first clutch housing and the second clutch housing, respectively.

The electric driving apparatus according to another embodiment of the invention may further include: a first force transmitting member movable along the rotation axis to press the first clutch plate package; a first piston configured to move along the rotating axis by hydraulic pressure to press the first force transmitting member; a second force transmitting member movable along the rotation axis to press the second clutch plate package; and a second piston configured to move along the rotating axis by hydraulic pressure to press the second force transmitting member.

The electric driving apparatus according to another embodiment of the present invention may further include a pair of clutch bearings rotatably supporting the clutch housing. At this time, the pair of the clutch bearings may be disposed in a radially inner space of the first piston and the first force transmitting member and in a radially inner space of the second piston and the second force transmitting member, respectively.

The electric driving apparatus according to another embodiment of the present invention may further include a piston housing forming a space in which the first and second pistons are disposed radially inside the first and second pistons. In this regard, the piston housing may include: a first axially extending portion extending along the rotation axis; a radially extending portion extending radially outward from the first axially extending portion; and a second axially extending portion extending along the rotation axis at a radial location further from the rotation axis than a radial location of the first axially extending portion. The clutch housing may include a sleeve portion extending in parallel with the rotating axis. The clutch bearing may be disposed in a space formed by the radially extending portion, the second axially extending portion, and the sleeve portion.

The clutch bearing may be a bevel roller bearing supported by the radially extending portion, the second axially extending portion, and the sleeve portion, respectively.

The first and second pistons may include respectively a body portion facing the radially extending portion and a plurality of protrusions respectively extending in parallel with the rotating axis at a radially outer end of the body portion. A radially inner end of the protrusion and radially inner ends of the first and second force transmitting members may be formed to face the second axially extending portion.

The electric driving apparatus according to another embodiment of the present invention may further include a return spring for returning the first and second pistons in a direction away from the force transmitting member. The return spring may be disposed to elastically support the body portion in the direction of the rotation axis with respect to the radially extending portion.

The first and second pistons may respectively include a ring-shaped body portion, and a plurality of protrusions extending parallel to the rotation axis from a radially outer end of the body portion.

The electric driving apparatus according to another embodiment of the present invention may further include a piston housing forming a space in which the first and second pistons are disposed radially inside the first and second pistons. The piston housing may include: a first axially extending portion extending along the rotation axis; a radially extending portion formed by extending radially outward from the first axially extending portion; and a second axially extending portion extending along the rotation axis at a radial location further from the rotation axis than a radial location of the first axially extending portion. The electric driving apparatus may further include a return spring for elastically supporting the first and second pistons to move away from the first and second force transmitting members, respectively, with respect to the radially extending portion.

The first and second force transmitting members may respectively have a disk-shaped body portion and a plurality of protrusions extending parallel to the rotational axis at radially inner ends of the body portion, and the protrusions of the first and second pistons and the protrusions of the first and second force transmitting members may be disposed to at least partially face an outer circumferential surface of the second axial extension.

The clutch housing may include a sleeve portion extending in parallel with the rotation axis, and the sleeve portion and the second axially extending portion are disposed to overlap at least partially in a direction of the rotation axis. Also, the electric driving apparatus may further include a clutch bearing disposed between the sleeve portion and the second axially extending portion to rotatably support the clutch housing.

According to an embodiment of the present invention, a double clutch assembly configured to selectively and variably rotationally drive a pair of output shafts using rotational driving force transmitted from a speed shifting unit of an electric driving apparatus includes: a clutch housing coupled to the speed shifting unit so as to be rotationally driven by the speed shifting unit and rotatably installed around a rotational axis; a first clutch hub and a second clutch hub respectively coupled to the pair of the output shafts to rotationally drive the pair of the output shafts and disposed adjacent to each other along the rotation axis in the clutch housing; a first clutch plate package operative to selectively effect a rotationally constrained engagement between the clutch housing and the first clutch hub; and a second clutch plate package operative to selectively effect a rotationally constrained engagement between the clutch housing and the second clutch hub. The clutch housing has a plurality of gears configured to receive rotational driving force of different rotational speeds from the speed shifting unit, respectively.

The clutch housing may include a first clutch housing and a second clutch housing that are disposed adjacent to each other along the rotation axis and coupled to each other to rotate together about the rotation axis, and the plurality of gears may include annular gears formed on outer circumferential surfaces of the first clutch housing and the second clutch housing to receive rotational driving force of different speeds from the speed shifting, respectively.

The double clutch assembly according to another embodiment of the present invention may further include: a first force transmitting member movable along the rotation axis to press the first clutch plate package; a first piston configured to move along the rotating axis by hydraulic pressure to press the first force transmitting member; a second force transmitting member movable along the rotation axis to press the second clutch plate package; and a second piston configured to move along the rotating axis by hydraulic pressure to press the second force transmitting member.

The first and second pistons may include respectively a body portion facing the radially extending portion and a plurality of protrusions respectively extending in parallel with the rotating axis at a radially outer end of the body portion, and a radially inner end of the protrusion and radially inner ends of the first and second force transmitting members may be formed to face the second axially extending portion.

The first and second pistons may respectively include a ring-shaped body portion, and a plurality of protrusions extending parallel to the rotation axis from a radially outer end of the body portion.

Effect of the Invention

According to the present invention, the double clutch assembly can rotate and drive the two output shafts through a simple and easy-to-manufacture structure and can minimize the increase in the radial size while securing a sufficient hydraulic pressure area for stable operation of the piston.

BRIEF DESCRIPTION OF THE DRAWINGS

FIG. 1 shows a cross-sectional view of an electric driving apparatus according to an embodiment of the present invention.

FIG. 2 shows a perspective view of a first speed reduction unit of an electric driving apparatus according to an embodiment of the present invention.

FIG. 3 is a cross-sectional view taken along line III-III of FIG. 2.

FIG. 4 shows an exploded perspective view of a first speed reduction unit of an electric driving apparatus according to an embodiment of the present invention.

FIG. 5 shows a perspective view of a first speed reduction unit, a second speed reduction unit, and a double clutch unit of an electric driving apparatus according to an embodiment of the present invention.

FIG. 6 shows a perspective view of a double clutch unit of an electric driving apparatus according to an embodiment of the present invention.

FIG. 7 is a cross-sectional view taken along line VI-VI of FIG. 5.

FIG. 8 shows a partial cross-sectional view of a double clutch unit and a housing of an electric driving apparatus according to an embodiment of the present invention.

FIG. 9 shows an exploded perspective view of the double clutch unit of the electric driving apparatus according to the embodiment of the present invention.

BEST MODE FOR CARRYING OUT THE INVENTION

Hereinafter, with reference to the accompanying drawings, embodiments of the present invention will be described in detail so that those skilled in the art can easily practice the present invention. However, the present invention may be embodied in many different forms and is not limited to the described embodiments.

An electric drive device 1 may be configured to drive a driving axle of a vehicle. The electric drive device 1 may be used as a device for independently driving a vehicle or may be applied to a vehicle using an existing internal combustion engine as a power source and used as a device for driving a vehicle together with an internal combustion engine.

FIG. 1 shows a cross-sectional view of an electric drive device according to an embodiment of the present invention. FIG. 1 is a cross-sectional view of an electric driving device according to an embodiment of the present invention cut along a V-shaped cutting line connecting three rotation shafts X1, X2, and X3. Referring to FIG. 1, an electric drive device 1 according to an embodiment of the present invention includes a speed shifting unit 2 that can be rotationally driven by an electric machine such as a motor 200, and a double clutch unit 3 which can be rotationally driven by the speed shifting unit. The double clutch unit can be driven by actuators 4 and 5 respectively. The electric drive device 1 may further include a housing 6 accommodating the speed shifting unit 2 and the double clutch unit 3.

The motor may include a stator and a rotatable rotor. The rotor is configured to be rotated by application of current supplied from a battery of the vehicle, and the rotor is connected to the motor shaft 7 in a power transmission manner so as to rotationally drive the motor shaft 7. Although not specified in the drawing, the motor shaft 7 may be arranged coaxially with the motor and may be coupled to an output element of the motor so as to be rotationally driven about the rotational axis X1 by the output element of the motor. For example, the motor shaft 7 may be connected to the output element of the motor in a gear coupling, spline coupling, or the like.

Although not shown in FIG. 1, the housing 6 may further include a housing for accommodating a motor on the right side of the housing 6 shown in FIG. 1, and the motor shaft 7 may be supported on the housing 6 to be rotatable by a bearing. The housing 6 may include a first housing 11 and a second housing 12 that are fastened to each other, and the first and second housings 11 and 12 may be fastened to each other with separate fastening members or they may be fastened to each other in a way such as welding.

The rotational motion of the motor shaft 7 is transmitted to the double clutch unit 3 via the speed shifting unit 2. That is, the rotation driving force of the motor is transmitted to the double clutch unit 3 through the motor shaft 7 and the speed shifting unit 2, and the double clutch unit 3 is configured to divide the transmitted torque and transfer the divided torque to the two output shafts 8 and 9. Further, the output shafts 8 and 9 may respectively be connected to a side shaft (not shown) connected to a drive wheel of the vehicle via a constant velocity joint (not shown).

The motor shaft 7 may be configured as a hollow shaft having a through hole 13 extending in the longitudinal direction, and may be supported on the housing 6 by a bearing so as to be rotatable around the rotation axis X1. One output shaft 8 of the two output shafts 8 and 9 may be coaxially arranged in the through hole 13 of the motor shaft 7, and in this respect, the electric driving apparatus 1 according to the embodiment of the present invention may be called a coaxial type.

A drive gear 14 is provided on the motor shaft 7 to rotate together with the motor shaft 7. The drive gear 14 extends in a circumferential direction of the motor shaft 7 to have a ring shape, whereby the drive gear 14 can rotate around the rotation axis X1 together with the motor shaft 7.

According to an embodiment of the present invention, the speed shifting unit 2 includes a first speed reduction portion 15 and a second speed reduction portion 16. The first speed reduction portion 15 and the second speed shifting portion 16 are configured to reduce the speed of the rotation of the motor shaft 7 at different rotational speeds and transmit it to the double clutch unit 3. The first and second speed shifting portions 15 and 16 may realize the speed shifting through a gear device that reduces rotational speed through gear teeth engagement.

The first speed reduction portion 15 includes an input gear 17, a speed shifting shaft 18 and an output gear 19, and similarly, the second speed reduction portion 16 also includes an input gear 21, a speed shifting shaft 22 and an output gear 23.

The input gears 17 and 21 are respectively engaged with the driving gear 14 and are rotationally driven by the driving gear 14. The speed shifting shafts 18 and 22 are disposed in the housing 6 so as to be rotatable about rotational axes X2 and X3 extending parallel to the rotational axis X1 of the motor shaft 7, respectively. As shown in FIG. 1, the speed shifting shafts 18 and 21 are inserted into the through holes 23 and 24 of the input gears 17 and 21 so as to be arranged coaxially with the input gears 17 and 21. The speed shifting shafts 18 and 22 are rotatably supported on the housing 6 by bearings, for example bevel roller bearings 81, 82, 83 and 84. Referring to FIGS. 1 and 4, a bevel roller bearing 82 may be supported on the housing 6 by a support ring 87. Needle bearings 25 and 26 are interposed between the input gears 17 and 21 and the speed shifting shafts 18 and 22 to allow relative rotation of the input gears 17 and 21 and the speed shifting shafts 18 and 22. Referring to FIGS. 1 and 4, a sleeve member 88 may be fastened to the transmission shaft 18, and a needle bearing 25 is disposed between the sleeve member 88 and the input gear 17 so that the input the gear 17 may be rotatably supported on the shift shaft 18.

The input gears 17 and 21 are configured to be selectively rotatably fixed to the speed shifting shafts 18 and 22 via the clutch units 27 and 28. That is, when the clutch units 27 and 28 are in an operating state, that is, in a state of transmitting rotational force, the rotation of the input gears 17 and 21 is transmitted to the speed shifting shafts 18 and 22 through the clutch units 27 and 28, When the clutch units 27 and 28 are in a state of non-transmitting rotational force, the input gears 17 and 21 rotate together with the drive gear 14 without rotating the shift shafts 18 and 22.

The two clutch units 27 and 28 respectively provided in the first and second speed reduction portions 15 and 16 have the same structure and act in the same way. The clutch units 27 and 28 may be configured to be operable by hydraulic pressure. Referring to FIGS. 1 to 3, the clutch units 27 and 28 include clutch housings 29 and 33, clutch hubs 30 and 34, and force transmitting members 31 and 35, pistons 32 and 36 and clutch plate packages 42 and 43, respectively. Further, the clutch units 27 and 28 may further include axial bearings 37 and 39 disposed between the force transmitting members 31 and 35 and the pistons 32 and 36 to rotatably support the force transmitting members 31 and 35, and return springs 38 and 89 for returning the force transmitting members 31 and 35.

The pistons 32 and 36 may have an annular shape and may be movably disposed in the axial directions X2 and X3 in the annular hydraulic chambers 40 and 41 formed in the housing 6 into which hydraulic pressure may be supplied.

The force transmitting member 31 transmits the axial force generated by the movement of the piston 32 to the clutch plate package 42 disposed within the clutch housing 29. As shown in FIG. 4, the force transmitting member 31 may include a body portion 49 having a shape of ring-shaped disc facing the piston 32, and a plurality of protrusions 50 axially protruding from the inner end of the body portion 49.

Referring to FIGS. 3 and 4, the clutch plate package 42 includes a plurality of outer plates 44 and a plurality of inner plates 45 that are alternately disposed in an axial direction, that is, in a rotational axis X2 direction. The outer plate 44 is axially movable and circumferentially constrained to the clutch housing 29, and the inner plate 45 is axially movable and circumferentially constrained to the clutch hub 30. Similarly, the clutch plate package 43 of the second speed reduction portion 16 also includes a plurality of outer plates and a plurality of inner plates, the outer plates being fastened to the clutch housing 33 and the inner plates being fastened to the clutch hub.

The clutch hubs 30 and 34 may be fixedly fastened to the input gear 17 or integrally formed with the input gear 17 so as to rotate about the rotation axis X2 together with the input gear 17, and the clutch housings 29 and 33 may be fixedly fastened to the speed shifting shafts 18 so as to rotate together with the transmission shaft 18 around the rotation axis X2.

A plurality of protrusions 50 may be arranged at equal intervals in the circumferential direction on the surface of the body portion 49, and each protrusion 50 penetrates through the axial through hole 52 formed in the input gear 17 to be extended to the space within the clutch housing 29 where the clutch plate package 42 is located. The force transmitting member 31 is fastened to the input gear 17 so as to rotate together with the input gear 17 by the protrusion 50 fastened to the axial through hole 52 of the input gear 17. At the same time, the force transmitting member 31 is configured to be movable in the axial direction X2 relative to the input gear 17 so as to transmit the axial acting force of the piston 32 to the clutch plate package 42 disposed in the clutch housing 29. At this time, the protrusion 50 of the force transmission member 31 may be configured to act on the pressure plate 48 axially movably disposed in the clutch housing 29 adjacent to the clutch plate package 42. Meanwhile, the other side of the clutch plate package 42 may be supported on a support plate 47 supported in the axial direction by an axial bearing 46 supported on the clutch housing 29.

When hydraulic pressure is supplied to the hydraulic chamber 40, the axial movement of the piston 32 (leftward movement in FIG. 3) occurs, and the axial movement of the piston 32 causes the axial movement of the force transmitting member 31, and thereby the protrusion 50 of the force transmitting member 31 presses the clutch plate package 42. When the clutch plate package 42 is pressed, the outer plate 44 and the inner plate 45 come into contact so that the clutch hub 30 and the clutch housing 29 together rotate around the rotation axis X2. As a result, the speed shifting shaft 18 can rotate together with the input gear 17.

The return spring 38 returns the force transmitting member 31 relative to the input gear 17 in a direction away from the clutch plate package 42. The return spring 38 may be a plate spring that elastically supports the force transmitting member 31 relative to the input gear 17. At this time, a snap ring 51 for limiting the return movement of the force transmitting member 31 may be fastened to the protrusion 50 of the force transmitting member 31. As shown in FIGS. 1 and 3, the snap ring 51 fastened to the protrusion 50 of the force transmitting member 31 comes into contact with the input gear 17, so that the additional return operation of the force transmitting member 31 can be blocked.

The output gears 19 and 23 are fastened to the speed shifting shafts 18 and 22 in a rotationally fixed state so as to rotate together with the transmission shafts 18 and 22. The output gears 19 and 23 may be integrally formed as a part of the speed shifting shafts 18 and 22 or may be separately formed and fastened to the speed shifting shafts 18 and 22. The output gears 19 and 23 may be annular gears formed on the outer circumferential surfaces of the speed shifting shafts 18 and 22 along the circumferential direction and may be integrally formed with the speed shifting shafts 18 and 22. Referring to FIGS. 1 and 5, the output gears 19 and 23 are respectively engaged with two annular gears 54 and 55 provided in the clutch housing 56 of the double clutch unit 3 to drive the double clutch unit 3. Accordingly, the clutch housing 56 acting as an input element of the double clutch unit 3 can be rotated by the rotation of the speed shifting shafts 18 and 23. At this time, the output gears 19 and 23 of the speed shifting shafts 18 and 22 and the annular gears 54 and 55 of the clutch unit 3 engaged therewith may include helical teeth and may be configured to have teeth ratio for achieving the desired speed reduction.

According to an embodiment of the present invention, it can be seen that two speed reduction ratios can be implemented through the speed shifting unit 2. The first speed reduction portion 15 and the second speed reduction portion 16 each have one speed shifting shafts 18 and 23 and two gear pairs. The first speed reduction portion 15 is a first gear pair having a first speed shifting ratio through an engagement of the drive gear 14 of the motor shaft 7 and the input gear 17, and a second gear pair of a second speed shifting ratio through an engagement of the output gear 19 of the speed shifting shaft 18 and the annular gear 54 of the double clutch unit 3. At this time, the input gear 17 of the first speed reduction portion 15 has more gear teeth than the driving gear 14 of the motor shaft 7 so as to the first speed shifting ratio of a predetermined speed reduction ratio, and also the annular gear 54 of the double clutch unit 3 has more gear teeth than the output gear 19 of the speed shifting shaft 18 as so to the second speed shifting ratio of a predetermined speed reduction ratio. Accordingly, the first speed reduction portion 15 implements a final speed shifting ratio by combination of the first speed shifting ratio and the second speed shifting ratio. Similarly, the second speed reduction portion 16 implements a final speed shifting ratio having two speed shifting ratios, that is, a first speed shifting ratio through an engagement of the drive gear 14 of the motor shaft 7 and the input gear 21 and a second speed shifting ratio through an engagement of the output gear 23 of the speed shifting shaft 22 and the annular gear 55 of the double clutch unit 3. At this time, the input gear 17 of the first speed reduction portion 15 and the input gear 21 of the second speed reduction portion 16 may have the same number of gear teeth, and the output gear 19 of the first sped reduction portion 15 may have fewer gear teeth than the output gear 23 of the second speed reduction portion 16, and the annular gear 54 of the double clutch unit 3 engaged with the output gear 19 of the first speed reaction portion 15 may have more gear teeth than the annular gear 55 of the double clutch unit 3 engaged with the output gear 23 of the second speed reduction portion 16. Due to such numbers of gear teeth, the first speed reduction portion 15 has a larger speed reduction ratio than that of the second speed reduction portion 16. The speed reduction ratios of the first speed reduction portion 15 and the second speed reduction portion 16 may be appropriately set as needed.

The double clutch unit 3 may include two clutches, each of which can operate independently. Referring to FIG. 1 and FIGS. 5 to 7, the double clutch unit 3 includes a clutch housing 56 as an input element and two clutch hubs as output elements, that is, first and second clutch hubs 57 and 58. The first clutch hub 57 is coupled to the first output shaft 8 in a rotationally fixed manner, and the first output shaft 8 transmits the applied torque to the side shaft (shown) through a constant velocity joint (not shown). Similarly, the second clutch hub 58 can be coupled to the second output shaft 9 in a rotationally fixed manner. The two clutch hubs 57 and 58 can be supported to each other rotatably about the axis of rotation X1 by means of an axial bearing 129. The axial bearing 129 has a ring shape and may be interposed between the clutch hubs 57 and 58 to rotatably support the clutch hubs 57 and 58 relative to each other.

The two annular gears 54 and 55 described above are formed on the outer circumferential surface of the clutch housing 56, respectively, and the clutch housing 56 receives the rotation driving force from the speed shifting shafts 18 and 22 via the two annular gears 54 and 55. The clutch housing 56 is supported by clutch bearings 59 and 60 so as to be rotationally driven by the speed shifting shafts 18 and 22. The clutch bearings 59 and 60 may be implemented as bevel roller bearings configured to allow axial forces to be introduced into the housing 6 while supporting them.

Torque may be transferred from the clutch housing 56 to the first and second clutch hubs 57 and 58 via two clutch plate packages, first and second clutch plate packages 64 and 65, respectively. Each of the clutch plate packages 64 and 65 includes a plurality of outer plates 66 and a plurality of inner plates 67 alternately disposed in the axial direction, that is, in the direction of the rotational axis X1. The outer and inner plates 66 and 67 may respectively have a ring-shaped disc shape. The outer plate 66 is connected to the clutch housing 56 to be axially movable and circumferentially constrained, e.g., in a spline coupling manner, and the inner plate 67 is connected to the clutch hubs 57 and 58 to be axially movable and circumferentially constrained, e.g., in a spline coupling manner. The double clutch unit 3 may be arranged coaxially with respect to the motor, and the clutch housing 56 is rotatably supposed within the housing 6 by means of the clutch bearings 59 and 60 in a state of being coaxial with the rotation axis X1 of the motor shaft 7. The first and second clutch hubs 57 and 58 rotating together with the first and second output shafts 8 and 9, respectively, are rotatably supported by the clutch housing 56 by means of radial bearings 85 and 86 to be rotatable relative to the clutch housing 56.

The clutch housing 56 includes a first clutch housing 61 and a second clutch housing 62 disposed to face each other, and the first and second clutch housings 61 and 62 are fastened to each other by a fastening bolt 63 to rotate together around the rotation axis X1. The fastening bolt 63 extends in a direction parallel to the rotation axis X1 and may be provided in plurality. Since the two clutch housings 61 and 62 come into close contact with each other in the axial direction and are fastened by the fastening bolt 63, the concentricity of the two clutch housings 61 and 62 can be improved.

The first and second clutch housings 61 and 62 are arranged coaxially with the first and second output shafts 8 and 9. The first and second clutch housings 61 and 62 are fastened to each other to form a substantially cylindrical space, and the clutch hubs 57 and 58 and the clutch plate packages 64 and 65 are disposed in the space formed by the first and second clutch housings 61 and 62.

As shown in FIGS. 5 to 7, the first and second clutch housings 61 and 62 respectively include annular gears 54 and 55 respectively engaged with the output gear 19 of the first speed reduction portion 15 and the output gear 22 of the second speed reduction portion 16. The two annular gears 54 and 55 are respectively disposed coaxially with the rotation axis X1 and may have different sizes and/or numbers of teeth. When the clutch unit 27 of the first speed reduction portion 15 or the clutch unit 28 of the second speed reduction portion 16 is in a power transmitting state, the rotational power is transmitted to one of the annular gears 54 and 55 of the two clutch housings 61 and 62, and the first and second clutch housings 61 and 62 fastened to each other to rotate together rotate together by the transmitted rotational power. When at least one of the two clutch plate packages 64 and 65 of the double clutch unit 3 is in power transmitting state with the clutch housings 61 and 62 rotating, the rotation power is output through at least one of the first output shaft 8 and the second output shaft 9.

Referring to FIGS. 1 and 7, the first clutch housing 61 includes a clutch coupling part 68 to which the outer clutch plate 66 is coupled and a cover portion 69 extending radially inwardly from an end (right end in FIG. 7) of the clutch fastening part 68, and may further include a sleeve part 70 extending axially from an inner end of the cover portion 69. The clutch coupling part 68 and the cover part 69 form a space where the clutch plate package 64 is disposed, and the sleeve part 70 forms a through hole through which the first output shaft 8 passes. The annular gear 54 engaged with the output gear 19 of the first speed reduction portion 15 may be formed on an outer circumferential surface of the clutch coupling part 68. In addition, the second clutch housing 62 includes a clutch coupling part 71 to which the outer clutch plate 66 is coupled, and a cover part 72 extending radially inwardly from an end (left end in FIG. 7) of the clutch coupling part 71, and may further include a sleeve 73 extending axially from an inner end of the cover part 72. The clutch coupling part 71 and the cover part 72 form a space where the clutch plate package 65 is disposed, and the sleeve part 73 forms a through hole through which the second output shaft 9 passes. The sleeve part 70 of the first clutch housing 61 and the sleeve part 73 of the second clutch housing 62 are rotatably supported by clutch bearings 59 and 60, respectively.

The two clutches of the double clutch unit 3 can be independently operated by two actuators 4 and 5 respectively. For this purpose, the two actuators 4 and 5 can be independently controlled by a hydraulic circuit controlled by a control unit (not shown), whereby torque transmitted to the first clutch hub 57 via the second clutch plate package 65 can be variably set independently of each other. Hereby, so-called torque vectoring, which can vary the torque of each driving wheel, is realized. The two actuators 4 and 5 are respectively disposed outside the first and second clutch housings 61 and 62 in the axial direction and are supported in opposite directions along the axis of rotation X1 with respect to the structure constituting the housing 6. Since the two actuators 4 and 5 are identical in structure and operation, only one actuator is described below.

The force transmitting members 101 and 102 transmit the axial force generated by the actuators 4 and 5 to the clutch plate packages 64 and 65 disposed within the clutch housings 61 and 62. The force transmitting members 101 and 102 are configured to be movable in the axial direction X1 by the axial force generated by the actuators 4 and 5. Referring to FIGS. 7, 8 and 9, the force transmitting members 101 and 102 include disc-shaped body parts 103 and 104 facing the cover parts 69 and 72 of the clutch housings 61 and 62, and a plurality of protrusions 105 and 106 protruding from the body parts 103 and 104 in the axial direction. The plurality of protrusions 105 and 106 may be arranged at equal intervals in the circumferential direction on the surface of the body parts 103 and 104, and each protrusion 105 and 106 extends into the space where the clutch plate packages 64 and 65 in the clutch housings 61 and 62 are located through axial through holes 107 and 108 that are formed on the cover parts 69 and 72 of the clutch housings 61 and 62. The force transmitting members 101 and 102 are coupled to the clutch housings 61 and 62 to rotate together with the clutch housings 61 and 62 by the protrusions 105 and 106 inserted into the axial through holes 107 and 108 of the clutch housings 61 and 62. Also, the force transmitting members 101 and 102 are configured to be axially movable relative to the clutch housings 61 and 62 so as to transfer the axial action force of the actuators 4 and 5 disposed outside the clutch housings 61 and 62 to the clutch plate packages 64 and 65 disposed within the clutch housings 61 and 62.

The projections 105 and 106 of the force transmitting members 101 and 102 are configured to act on pressure plates 109 and 110 axially movably disposed within the clutch housings 61 and 62 adjacent to the clutch plate packages 64 and 65. Meanwhile, a reaction plate 111 is installed in the clutch housing 56 so as to be positioned between the two clutch plate packages 64 and 65 in a state in which axial movement is blocked. The reaction plate 111 may have a ring-shaped disk shape, and a radial outer end is inserted into an annular groove 112 formed between the first clutch housing 61 and the second clutch housing 62 to block axial movement thereof. The clutch plate packages 64 and 65 respectively disposed on both sides of the reaction plate 111 are supported by the reaction plate 111 in the axial direction.

The actuators 4 and 5 may be implemented as hydraulic actuators, and each actuator 4 and 5 includes pistons 113 and 114 movable in the axial direction X1 by hydraulic pressure. The piston indicated by reference numeral 113 is pushed to move along the axial direction X1 to the left in FIG. 7 by hydraulic pressure, and the piston indicated by reference numeral 114 is pushed to move along the axial direction X1 to the right in FIG. 7 by hydraulic pressure. The pistons 113 and 114 may have an annular shape as a whole and may be disposed in annular cylinder chambers 115 and 116 formed in the housing 6 as shown in FIG. 1. The pistons 113 and 114 may be axially supported via support plates 119 and 120 against retaining rings 117 and 118 fastened to the clutch housing 6. Hydraulic passages 121 and 122 for supplying hydraulic pressure to spaces between the pistons 113 and 114 and the support plates 119 and 120 may be formed in the clutch housing 6. The pistons 113 and 114 may move in the axial direction X1 toward the clutch housings 61 and 62 by hydraulic pressure supplied into the space between the support plates 119 and 120 and the pistons 113 and 114.

Axial bearings 123 and 124 are interposed in an axially movable state between the pistons 113 and 114 and the force transmitting members 101 and 102, and the axial force of the pistons 113 and 114 is transmitted to the force transmitting members 101 and 102 through the axial bearings 123 and 124. As the pistons 113 and 114 move toward the clutch housings 61 and 62, the axial bearings 123 and 124 and the force transmitting members 101 and 102 are pushed by the pistons 113 and 114 to move together in the axial direction.

When the actuators 4 and 5 do not operate, that is, when hydraulic pressure is not supplied to the space between the pistons 113 and 114 and the support plates 119 and 120, return springs 127 and 128 for returning the pistons 113 and 114 away from the clutch housings 61 and 62 may be provided. Referring to FIGS. 1 and 8, the return springs 127 and 128 elastically support the pistons 113 and 114 relative to the clutch housing, more particularly relative to the piston housing 2 131 and 132 to apply forces to the pistons 113 and 114 to urge the pistons 113 and 114 to move away from the clutch housings 61 and 62. When the actuators 4 and 5 do not operate, the pistons 113 and 114 are separated from the force transmitting members 101 and 102 by the elastic restoring force of the return springs 127 and 128 so as not to apply axial force to the force transmitting member 101 and 102. As shown in FIGS. 1 and 8, the return springs 127 and 128 may be a plate spring that elastically supports the pistons 113 and 114 relative to the piston housings 131 and 132 in a direction away from the clutch housings 61 and 62. FIGS. 7 and 8 show a state in which the pistons 113 and 114 are pushed by the elastic restoring force of the return springs 127 and 128 and are in close contact with the support plates 119 and 120, and in this state, the pistons 113 and 114 does not transmit an axial action force to the force transmitting members 101 and 102. Meanwhile, when hydraulic pressure is supplied to the space between the support plates 119 and 120 and the pistons 113 and 114, the pistons 113 and 114 moves toward the clutch housings 61 and 62 while compressing the return springs 127 and 128 toward the clutch housings 61 and 62 to move the force transmitting members 101 and 102. Accordingly, the force transmitting members 101 and 102 press the clutch plate packages 64 and 65 so that the clutch operates.

Referring to FIG. 8, the clutch hubs 57 and 58 may include outer sleeves 141 and 142, inner sleeves 143 and 144, and connecting portions 145 and 146 connecting the outer sleeves 141 and 142 and the inner sleeves 143 and 144. The outer sleeves 141 and 142 may extend parallel to the axial direction X1 to have a hollow cylinder shape, and the clutch plate packages 64 and 65 may be coupled to outer circumferential surfaces of the outer sleeves 141 and 142. The inner sleeves 143 and 144 may extend parallel to the axial direction X1 at the radially inner side of the outer sleeves 141 and 142 to have a hollow cylinder shape.

Referring to FIGS. 1 and 7, the inner sleeves 143 and 144 form an axial through hole into which the output shafts 8 and 9 are inserted, and spline structures 171 and 172 for spline coupling with the output shafts 8 and 9 may be formed on the inner circumference of the inner sleeves 143 and 144. The clutch hubs 57 and 58 and the output shafts 8 and 9 rotate together about the axis of rotation X1 by spline coupling. Radial bearings 85 and 86 rotatably support the outer circumferential surfaces of the inner sleeves 143 and 144 and the clutch housings 61 and 62 relative to each other, whereby the relative rotation of the clutch housings 61 and 62 and the clutch hubs 57 and 58 can be allowed. The connecting portions 145 and 146 extend in the radial direction to connect one end of the outer sleeves 141 and 142 and one end of the inner sleeves 143 and 144. The connecting portions 145 and 146 of the two clutch hubs 57 and 58 are disposed to face each other, and a axial bearing 129 is disposed to be supported by the two connecting portions 145 and 146, respectively. This allows the two clutch hubs 57 and 58 to rotate relative to each other and to rotate independently.

According to an embodiment of the present invention, the pistons 113 and 114 are configured to increase the effective area on which hydraulic pressure acts without increasing the axial and radial lengths of the electric driving apparatus. Referring to FIGS. 8 and 9, the pistons 113 and 114 have ring-shaped body parts 151 and 153, and a plurality of protrusions 152 and 154 extending in parallel with the axial direction X1 from a radially outer edge area. The outer surfaces in the axial direction of the body parts 151 and 153 facing the support plates 119 and 120 are surfaces on which hydraulic pressure acts, and the protrusions 152 and 154 are the parts that performs a function of transmitting the axial force to the force transmission members 101 and 102 through the bearings 123 and 124. Since the protruding portions 152 and 154 protrude from the edge regions of the body portions 151 and 153, an effective area of the body portions 151 and 153 on which hydraulic pressure acts may be sufficiently obtained.

Referring to FIG. 8, the piston housings 131 and 132 include first axially extending portions 161 and 162, radially extending portions 163 and 164 and second axially extending portions 165 and 166. The first axially extending portions 161 and 162 and the second axially extending portions 165 and 166 respectively extend along the axial direction X1 at different radial positions. As shown in FIG. 8, the second axially extending portions 165 and 166 are extended along the axial direction X1 at a greater radial position than the first axially extending portions 161 and 162, that is, at a position farther from the axial direction X1, and the radially extending portions 163 and 164 extend in a radial direction to connect one end of the first axially extending portions 161 and 162 and one end of the second axially extending portions 165 and 166. Referring to FIG. 8, the first axially extending portions 161 and 162 face radially inner ends of the body portions 151 and 152 of the pistons 113 and 114, and the radially extending portions 163 and 164 faces the axial sides of the body portions 151 and 152 of the pistons 113 and 114. Also, the second axially extending portions 165 and 166 face radially inner ends of the protrusions 152 and 154 of the pistons 113 and 114. Due to the shapes and arrangements of the pistons 113 and 114 and the piston housings 131 and 132, the inner space in the radial direction of the second axially extending portions 165 and 166 of the piston housings 131 and 132 can be utilized, and in the embodiment of the present invention, as shown in FIG. 8, clutch bearings 59 and 60 supporting the clutch housings 161 and 162 are disposed in this space.

More specifically, the second axially extending portions 165 and 166 of the piston housings 131 and 132 are disposed radially outward than the sleeve portions 70 and 73 of the clutch housings 57 and 58, and at the same time the second axially extending portions 165 and 166 of the housings 131 and 132 and the sleeve portions 70 and 73 of the clutch housings 57 and 58 are arranged to overlap at least partially in the axial direction. As a result, the ring-shaped bearing accommodating spaces 181 and 182 are formed between the second axially extending portions 165 and 166 of the piston housings 131 and 132 and the sleeve portions 70 and 73 of the clutch housings 57 and 58 are formed, and the clutch bearings 59 and 60 are disposed in the bearing accommodating spaces 181 and 182, respectively. As a result, as shown in FIG. 7 and the like, the clutch bearings 59 and 60 are disposed in radially inner spaces of the protrusions 153 and 154 of the pistons 113 and 114 and the force transmitting members 101 and 102, and accordingly, the radial dimension of the overall system can be reduced. At this time, the clutch bearings 59 and 60 may be bevel roller bearings, and the bevel roller bearings 59 and 60 are radially supported by the sleeve parts 70 and 73 of the clutch housings 57 and 58 and the second axially extending portions 165 and 166 of the piston housings 131 and 132 and at the same time are axially supported by the cover portions 69 and 70 of the clutch housings 57 and 58 and the radially extending portions 163 and 164 of the piston housings 131 and 132, respectively. With this structure, a sufficient effective area of the pistons 113 and 114 on which hydraulic pressure is applied can be obtained and a space in which the clutch bearings 59 and 60 supporting the clutch housings 57 and 58 without significantly increasing the radial and axial dimensions of the entire device can be obtained.

In addition, as shown in FIG. 8, the radial inner circumferential surface of the body portions 103 and 104 of the force transmitting members 101 and 102 and the radially inner circumferential surface of the axial bearings 123 and 124 interposed between the pistons 113 and 114 and the force transmitting members 101 and 102 are disposed to face the outer circumferential surfaces of the second axially extending portions 165 and 166 of the piston housings 131 and 132. Due to the structures and arrangements of the piston housings 131 and 132, the pistons 113 and 114, the bearings 123 and 124, and the force transmitting members 101 and 102, a compact structure is obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention can be applied to an electric driving apparatus of a vehicle, so it has an industrial applicability.

The invention claimed is:
1. An electric driving apparatus comprising:
a housing;
an electric machine comprising a motor shaft rotatably supported by the housing;
a speed shifting unit for reducing a rotational speed of a rotational driving force of the motor shaft; and a double clutch unit configured to selectively rotationally drive a first output shaft and a second output shaft, wherein the double clutch unit comprises:

a clutch housing coupled to the speed shifting unit so as to be rotationally driven by the speed shifting unit and rotatably installed around a rotational axis;

a first clutch hub and a second clutch hub respectively coupled to the first output shaft and the second output shaft to rotationally drive the first output shaft and the second output shaft and disposed adjacent to each other along the rotation axis in the clutch housing;

a first clutch plate package operative to selectively effect a rotationally constrained engagement between the clutch housing and the first clutch hub; and a second clutch plate package operative to selectively effect a rotationally constrained engagement between the clutch housing and the second clutch hub, wherein the speed shifting unit comprises a first output gear and a second output gear that can be independently rotationally driven by the motor shaft, wherein the clutch housing comprises a first gear and a second gear configured to be engaged with the first and second output gears to implement rotational driving force at different rotational speeds, wherein the clutch housing comprises a first clutch housing and a second clutch housing that are disposed adjacent to each other along the rotation axis and coupled to each other to rotate together about the rotation axis, and wherein the first and second clutch housings are coaxially coupled to each other by a fastening member and the first gear and the second gear are respectively provided in the first clutch housing and the second clutch housing.

2. The electric driving apparatus of claim 1, further comprising a reaction plate interposed between the first and second clutch plate packages to respectively support the first and second clutch plate packages along a direction of the rotation axis.

3. The electric driving apparatus of claim 2, wherein the reaction plate is installed to be inserted into an annular groove formed by the first and second clutch housings to block movement along the direction of the rotation axis.

4. The electric driving apparatus of claim 1, wherein the first and second clutch hubs are supported relative to each other so as to be relatively rotatable about the rotation axis by an axial bearing interposed therebetween.

5. An electric driving apparatus comprising:

a housing;

an electric machine comprising a motor shaft rotatably supported by the housing;

a speed shifting unit for reducing a rotational speed of a rotational driving force of the motor shaft; and a double clutch unit configured to selectively rotationally drive a first output shaft and a second output shaft, wherein the double clutch unit comprises:

a clutch housing coupled to the speed shifting unit so as to be rotationally driven by the speed shifting unit and rotatably installed around a rotational axis;

a first clutch hub and a second clutch hub respectively coupled to the first output shaft and the second output shaft to rotationally drive the first output shaft and the second output shaft and disposed adjacent to each other along the rotation axis in the clutch housing;

a first clutch plate package operative to selectively effect a rotationally constrained engagement between the clutch housing and the first clutch hub; and a second clutch plate package operative to selectively effect a rotationally constrained engagement between the clutch housing and the second clutch hub, wherein the speed shifting unit comprises a first output gear and a second output gear that can be independently rotationally driven by the motor shaft, wherein the clutch housing comprises a first gear and a second gear configured to be engaged with the first and second output gears to implement rotational driving force at different rotational speeds, wherein the first gear and the second gear respectively comprise a first and second annular gear provided on an outer circumferential surface of the clutch housing, wherein the clutch housing comprises a first clutch housing and a second clutch housing that are disposed adjacent to each other along the rotation axis and fastened to each other to rotate together about the rotation axis, and wherein the first and second annular gears are provided on outer circumferential surfaces of the first clutch housing and the second clutch housing, respectively.

6. An electric driving apparatus comprising:

a housing;

an electric machine comprising a motor shaft rotatably supported by the housing;

a speed shifting unit for reducing a rotational speed of a rotational driving force of the motor shaft; and a double clutch unit configured to selectively rotationally drive a first output shaft and a second output shaft, wherein the double clutch unit comprises:

a clutch housing coupled to the speed shifting unit so as to be rotationally driven by the speed shifting unit and rotatably installed around a rotational axis;

a first clutch hub and a second clutch hub respectively coupled to the first output shaft and the second output shaft to rotationally drive the first output shaft and the second output shaft and disposed adjacent to each other along the rotation axis in the clutch housing;

a first clutch plate package operative to selectively effect a rotationally constrained engagement between the clutch housing and the first clutch hub; and a second clutch plate package operative to selectively effect a rotationally constrained engagement between the clutch housing and the second clutch hub, wherein the speed shifting unit comprises a first output gear and a second output gear that can be independently rotationally driven by the motor shaft, wherein the clutch housing comprises a first gear and a second gear configured to be engaged with the first and second output gears to implement rotational driving force at different rotational speeds, wherein the electric driving apparatus further comprises:

a first force transmitting member movable along the rotation axis to press the first clutch plate package;

a first piston configured to move along the rotating axis by hydraulic pressure to press the first force transmitting member;

a second force transmitting member movable along the rotation axis to press the second clutch plate package; and a second piston configured to move along the rotating axis by hydraulic pressure to press the second force transmitting member, wherein the electric driving apparatus further comprises a pair of clutch bearings rotatably supporting the clutch housing, wherein the pair of the clutch bearings are disposed in a radially inner space of the first piston and the first force transmitting member and in a radially inner space of the second piston and the second force transmitting member, respectively wherein the electric driving apparatus further comprises a piston housing forming a space in which the first and second pistons are disposed, wherein the piston housing comprises:

a first axially extending portion extending along the rotation axis;

a radially extending portion extending radially outward from the first axially extending portion; and a second axially extending portion extending along the rotation axis at a radial location further from the rotation axis than a radial location of the first axially extending portion, wherein the clutch housing comprises a sleeve portion extending in parallel with the rotating axis, wherein the clutch bearing is disposed in a space formed by the radially extending portion, the second axially extending portion, and the sleeve portion, wherein the first and second pistons comprise respectively a body portion facing the radially extending portion and a plurality of protrusions respectively extending in parallel with the rotating axis at a radially outer end of the body portion, and wherein a radially inner end of the protrusion and radially inner ends of the first and second force transmitting members are formed to face the second axially extending portion.

7. The electric driving apparatus of claim 6, wherein the clutch bearing is a bevel roller bearing supported by the radially extending portion, the second axially extending portion, and the sleeve portion, respectively.

8. The electric driving apparatus of claim 6, further comprising a return spring for returning the first and second pistons in a direction away from the force transmitting member, wherein the return spring is disposed to elastically support the body portion in the direction of the rotation axis with respect to the radially extending portion.

9. An electric driving apparatus comprising:

a housing;

an electric machine comprising a motor shaft rotatably supported by the housing;

a speed shifting unit for reducing a rotational speed of a rotational driving force of the motor shaft; and a double clutch unit configured to selectively rotationally drive a first output shaft and a second output shaft, wherein the double clutch unit comprises:

a clutch housing coupled to the speed shifting unit so as to be rotationally driven by the speed shifting unit and rotatably installed around a rotational axis;

a first clutch hub and a second clutch hub respectively coupled to the first output shaft and the second output shaft to rotationally drive the first output shaft and the second output shaft and disposed adjacent to each other along the rotation axis in the clutch housing;

a first clutch plate package operative to selectively effect a rotationally constrained engagement between the clutch housing and the first clutch hub; and a second clutch plate package operative to selectively effect a rotationally constrained engagement between the clutch housing and the second clutch hub, wherein the speed shifting unit comprises a first output gear and a second output gear that can be independently rotationally driven by the motor shaft, wherein the clutch housing comprises a first gear and a second gear configured to be engaged with the first and second output gears to implement rotational driving force at different rotational speeds, wherein the electric driving apparatus further comprises:

a first force transmitting member movable along the rotation axis to press the first clutch plate package;

a first piston configured to move along the rotating axis by hydraulic pressure to press the first force transmitting member;

a second force transmitting member movable along the rotation axis to press the second clutch plate package; and a second piston configured to move along the rotating axis by hydraulic pressure to press the second force transmitting member, and wherein the first and second pistons respectively comprise a ring-shaped body portion, and a plurality of protrusions extending parallel to the rotation axis from a radially outer end of the body portion.

10. The electric driving apparatus of claim 9, further comprising a piston housing forming a space in which the first and second pistons are disposed radially inside the first and second pistons, wherein the piston housing comprises:

a first axially extending portion extending along the rotation axis;

a radially extending portion formed by extending radially outward from the first axially extending portion; and a second axially extending portion extending along the rotation axis at a radial location further from the rotation axis than a radial location of the first axially extending portion, and further comprising a return spring for elastically supporting the first and second pistons to move away from the first and second force transmitting members, respectively, with respect to the radially extending portion.

11. The electric driving apparatus of claim 10, wherein the first and second force transmitting members respectively have a disk-shaped body portion and a plurality of protrusions extending parallel to the rotational axis at radially inner ends of the body portion, and wherein the protrusions of the first and second pistons and the protrusions of the first and second force transmitting members are disposed to at least partially face an outer circumferential surface of the second axially extending portion.

12. The electric driving apparatus of claim 10, wherein the clutch housing comprises a sleeve portion extending in parallel with the rotation axis, wherein the sleeve portion and the second axially extending portion are disposed to overlap at least partially in a direction of the rotation axis, and further comprising a clutch bearing disposed between the sleeve portion and the second axially extending portion to rotatably support the clutch housing.

13. A double clutch assembly configured to selectively and variably rotationally drive a pair of output shafts using rotational driving force transmitted from a speed shifting unit of an electric driving apparatus, comprising:

a clutch housing coupled to the speed shifting unit so as to be rotationally driven by the speed shifting unit and rotatably installed around a rotational axis;

a first clutch hub and a second clutch hub respectively coupled to the pair of the output shafts to rotationally drive the pair of the output shafts and disposed adjacent to each other along the rotation axis in the clutch housing;

a first clutch plate package operative to selectively effect a rotationally constrained engagement between the clutch housing and the first clutch hub; and a second clutch plate package operative to selectively effect a rotationally constrained engagement between the clutch housing and the second clutch hub, wherein the clutch housing has a plurality of gears configured to receive rotational driving force of different rotational speeds from the speed shifting unit, respectively, wherein the clutch housing comprises a first clutch housing and a second clutch housing that are disposed adjacent to each other along the rotation axis and coupled to each other to rotate together about the rotation axis, and wherein the plurality of gears comprise annular gears formed on outer circumferential surfaces of the first clutch housing and the second clutch housing to receive rotational driving force of different speeds from the speed shifting, respectively.

14. The double clutch assembly of claim 13, further comprising:

a first force transmitting member movable along the rotation axis to press the first clutch plate package;

a first piston configured to move along the rotating axis by hydraulic pressure to press the first force transmitting member;

a second force transmitting member movable along the rotation axis to press the second clutch plate package; and a second piston configured to move along the rotating axis by hydraulic pressure to press the second force transmitting member.

15. The double clutch assembly of claim 14, wherein the first and second pistons comprise respectively a body portion facing the radially extending portion and a plurality of protrusions respectively extending in parallel with the rotating axis at a radially outer end of the body portion, and wherein a radially inner end of the protrusion and radially inner ends of the first and second force transmitting members are formed to face the second axially extending portion.

16. The double clutch assembly of claim 14, wherein the first and second pistons respectively comprise a ring-shaped body portion, and a plurality of protrusions extending parallel to the rotation axis from a radially outer end of the body portion.

* * * * *